(12) United States Patent
Toledo et al.

(10) Patent No.: US 8,558,429 B2
(45) Date of Patent: Oct. 15, 2013

(54) SYSTEMS, METHODS, AND APPARATUS FOR LIFTING BRUSHES OF AN INDUCTION MOTOR

(75) Inventors: Thiago Arouca Toledo, Campinas (BR); Nelson Kawasaki, Campinas (BR); Radhakrishna Darbha, Hyderabad (IN)

(73) Assignee: General Electric Company, Schenectady, NY (US)

( * ) Notice: Subject to any disclaimer, the term of this patent is extended or adjusted under 35 U.S.C. 154(b) by 318 days.

(21) Appl. No.: 12/985,089

(22) Filed: Jan. 5, 2011

(65) Prior Publication Data

US 2012/0169176 A1    Jul. 5, 2012

(51) Int. Cl.
*H02K 17/02* (2006.01)
*H01R 39/00* (2006.01)

(52) U.S. Cl.
USPC ............................ 310/240; 310/232; 310/244

(58) Field of Classification Search
USPC .......................... 310/143, 148, 240, 244, 232
See application file for complete search history.

(56) References Cited

U.S. PATENT DOCUMENTS

| | | | | |
|---|---|---|---|---|
| 1,392,193 A | * | 9/1921 | Mills ............................ | 310/232 |
| 1,661,014 A | * | 2/1928 | Schmock ..................... | 310/232 |
| 1,669,576 A | * | 5/1928 | Schenkel ...................... | 363/150 |
| 1,680,795 A | | 8/1928 | Leland | |
| 1,698,799 A | | 1/1929 | Leland | |
| 1,706,068 A | | 3/1929 | Leland | |
| 1,756,692 A | | 4/1930 | Leland | |
| 2,346,831 A | * | 4/1944 | Drury ........................... | 439/839 |
| 2,475,276 A | | 7/1949 | Briggs | |
| 3,376,483 A | | 4/1968 | Stilley et al. | |
| 3,591,820 A | | 7/1971 | Jones | |
| 3,686,514 A | | 8/1972 | Dube et al. | |
| 3,757,190 A | | 9/1973 | Shelley | |
| 3,826,942 A | | 7/1974 | Twarog, Jr. | |
| 3,842,301 A | | 10/1974 | Smith | |
| 3,984,716 A | | 10/1976 | Stark | |
| 4,030,006 A | | 6/1977 | Elger | |
| 4,137,474 A | | 1/1979 | Krieger | |
| 4,209,213 A | | 6/1980 | Wussow | |
| 4,246,506 A | | 1/1981 | Vartanian et al. | |
| 4,271,336 A | | 6/1981 | Shitrai | |
| 4,334,159 A | | 6/1982 | Ooki et al. | |
| 4,346,321 A | | 8/1982 | Frister | |
| 4,398,113 A | | 8/1983 | Lewis | |

(Continued)

FOREIGN PATENT DOCUMENTS

| | | |
|---|---|---|
| EP | 0038596 | 10/1981 |
| EP | 0081828 | 6/1983 |

(Continued)

*Primary Examiner* — Tran Nguyen
(74) *Attorney, Agent, or Firm* — Sutherland Asbill & Brennan LLP

(57) ABSTRACT

Systems, methods, and apparatus associated for lifting brushes and shorting slip rings are provided. One embodiment may include an actuating mechanism in operable communication with multiple brushes and a plurality of electrical contacts. Each of the brushes may be adapted for selective contact with a respective slip ring of an induction motor. The electrical contacts may be in electrical communication with respective terminals of rotor windings of the induction motor. When the actuating mechanism is actuated, at least a portion of the electrical contacts create electrical shorts between at least a portion of the slip rings and the rotor windings of the induction motor. When the actuating mechanism is actuated, at least a portion of the brushes are lifted from contacting the plurality of slip rings.

18 Claims, 9 Drawing Sheets

(56) References Cited

U.S. PATENT DOCUMENTS

| | | |
|---|---|---|
| 4,404,487 A | 9/1983 | Nimura |
| 4,406,961 A | 9/1983 | Pfluger |
| 4,410,821 A | 10/1983 | Kurt |
| 4,420,198 A | 12/1983 | Zerlik |
| 4,436,367 A | 3/1984 | Lewis |
| 4,447,752 A | 5/1984 | Boyce |
| 4,516,047 A | 5/1985 | Duverger |
| 4,535,264 A | 8/1985 | Allport |
| 4,562,368 A | 12/1985 | Weldon |
| 4,591,775 A | 5/1986 | Nussel et al. |
| 4,602,181 A | 7/1986 | Dietrich |
| 4,645,962 A | 2/1987 | Freeman |
| 4,870,311 A | 9/1989 | Chase |
| 5,220,588 A | 6/1993 | Deucher |
| 5,285,125 A * | 2/1994 | Lang .............. 310/240 |
| 5,329,198 A | 7/1994 | Schmidt et al. |
| 5,641,012 A | 6/1997 | Boggs |
| 5,773,906 A | 6/1998 | Mukai |
| 5,825,114 A | 10/1998 | Mukai |
| 5,866,967 A | 2/1999 | Sasaki |
| 5,886,447 A | 3/1999 | Hatsios et al. |
| 5,923,114 A | 7/1999 | Senni |
| 6,012,563 A | 1/2000 | Aoki |
| 6,252,331 B1 | 6/2001 | Mildice |
| 6,281,610 B1 | 8/2001 | Kliman et al. |
| 6,400,057 B2 | 6/2002 | Vesper et al. |
| 6,469,414 B2 | 10/2002 | Rehder et al. |
| 6,472,791 B1 | 10/2002 | Rehder et al. |
| 6,495,940 B2 | 12/2002 | Kliman |
| 6,628,101 B2 | 9/2003 | Dymond et al. |
| 6,861,779 B2 | 3/2005 | Weeber et al. |
| 6,903,482 B2 | 6/2005 | Rehder et al. |
| 6,960,922 B2 | 11/2005 | Klaar |
| 7,001,184 B2 | 2/2006 | Abouchar |
| 7,045,987 B2 | 5/2006 | Niiranen |
| 7,323,796 B2 | 1/2008 | Oomori |
| 2002/0070624 A1 | 6/2002 | Rehder et al. |
| 2005/0083009 A1 | 4/2005 | Niiranen |
| 2006/0131970 A1 | 6/2006 | Karam |
| 2007/0257577 A1 | 11/2007 | Bizjak |
| 2008/0024087 A1 | 1/2008 | Bixel |
| 2008/0246360 A1 * | 10/2008 | Nakano et al. ........ 310/148 |
| 2009/0320279 A1 | 12/2009 | Jayko et al. |
| 2011/0050150 A1 * | 3/2011 | Lilliestrale .......... 318/716 |

FOREIGN PATENT DOCUMENTS

| | | |
|---|---|---|
| EP | 0127909 A1 | 4/1984 |
| EP | 0268010 B1 | 5/1988 |
| EP | 0520994 B1 | 1/1995 |
| EP | 0587308 B1 | 1/1998 |
| WO | 2006024920 | 3/2006 |
| WO | WO 2009091319 A1 * | 7/2009 |

* cited by examiner

SYSTEMS, METHODS, AND APPARATUS FOR LIFTING BRUSHES OF AN INDUCTION MOTOR

FIELD OF THE INVENTION

Embodiments of the invention relate generally to induction motors, and more specifically relate to systems, methods, and apparatus for lifting brushes of an induction motor.

BACKGROUND OF THE INVENTION

Typically, to initially rotate the rotor of a wound rotor induction motor ("WRIM"), a high resistance is inserted into a rotor circuit to produce torque and limit current. As the angular speed of the rotor increases, the resistance is decreased. Typically, the external rotor resistance circuit is electrically connected to the rotor winding via slip rings (also referred to as "collector rings") and brushes, the brushes applying current to the slip rings to initially energize and rotate the rotor. As the speed approaches rated values, the rotor windings are shorted so that a sufficient magnetic field can be induced into the rotor windings from the stator winding to produce the required torque. However, constantly maintaining brush contact with the slip rings after start-up to achieve the short circuit between the slip rings is inefficient because of the brush wear caused by a friction between the rings and brushes. Additionally, since most brushes are carbon based, carbon dust typically accumulates in the motor from the brush wear.

It is, therefore, desirable to provide systems, methods, and apparatus for lifting brushes and shorting slip rings of an induction motor.

BRIEF DESCRIPTION OF THE INVENTION

Embodiments of the invention can address some or all of the needs addressed above. According to one embodiment, a brush lifting system for an induction motor is provided. The brush lifting system may include: a shaft in operable communication with a WRIM rotor; multiple slip rings positioned radially around the shaft and in electrical communication with rotor windings of the WRIM; multiple brushes adapted for selective contact with a respective one of the plurality of slip rings. In addition, the system may include multiple selectively activating electrical contacts in electrical communication with respective terminals of the rotor windings of the WRIM; and an actuating mechanism in operable communication with at least a portion the brushes and at least a portion the electrical contacts. When the actuating mechanism is actuated, at least a portion the electrical contacts create electrical shorts between at least a portion the slip rings and the rotor windings of the WRIM and at least a portion the plurality of brushes are lifted from contacting at least a portion the plurality of slip rings.

According to another embodiment, a method for selectively engaging brushes with slip rings for an induction motor is provided. The method may include: providing multiple slip rings positioned radially around a shaft in operable communication with a WRIM rotor, wherein the plurality of slip rings are in electrical communication with rotor windings of the WRIM; and providing multiple brushes, wherein each of the brushes is adapted for selective contact with a respective one of the slip rings. In addition, the method may include selectively creating electrical shorts between at least a portion the slip rings and at least a portion the rotor windings of the WRIM; and selectively lifting at least a portion the brushes from at least a portion the slip rings.

According to yet another embodiment, a brush lifting system for an induction motor is provided. The system may include an actuating mechanism in operable communication with multiple brushes and a plurality of electrical contacts. Each of the brushes may be adapted for selective contact with a respective slip ring of an induction motor. The electrical contacts may be in electrical communication with respective terminals of rotor windings of the induction motor. When the actuating mechanism is actuated, at least a portion of the electrical contacts create electrical shorts between at least a portion of the slip rings and the rotor windings of the induction motor. When the actuating mechanism is actuated, at least a portion of the brushes are lifted from contacting the plurality of slip rings.

Other embodiments, aspects, and features will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale, and wherein.

DETAILED DESCRIPTION OF THE INVENTION

Figure 1:
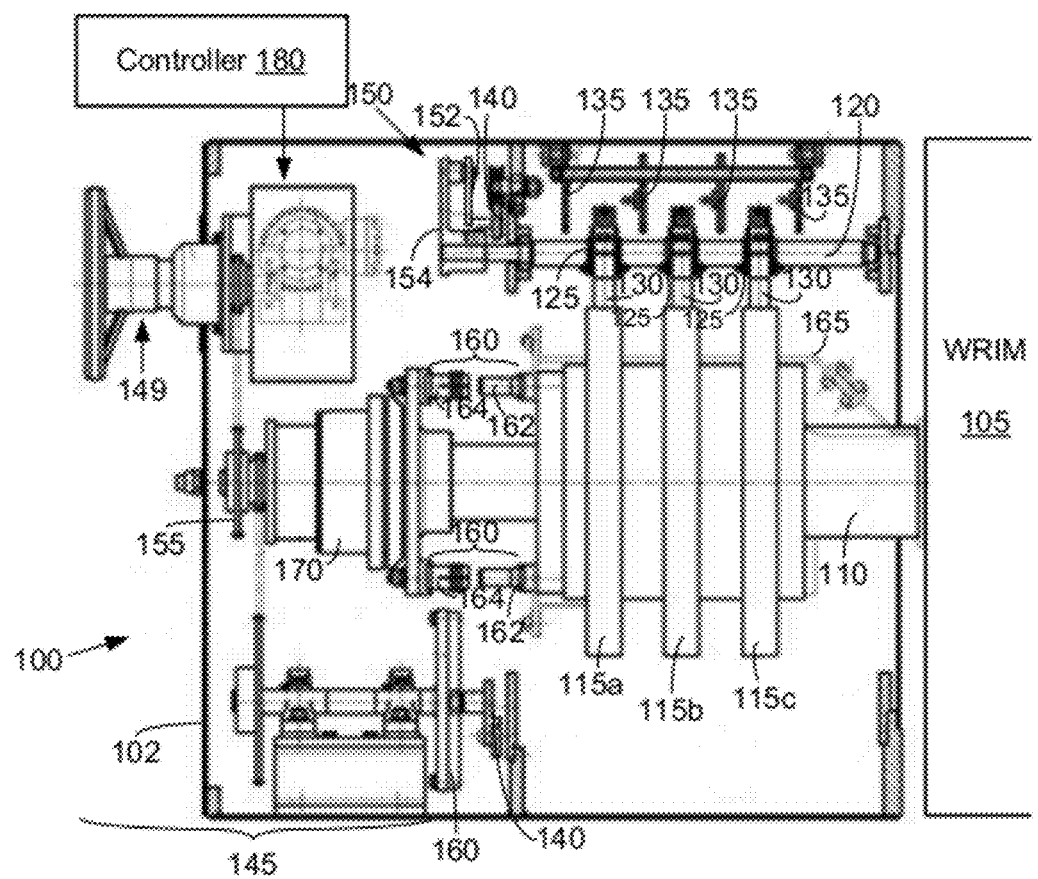
FIG. 1 is a cross-sectional side view schematic diagram of a brush lifting and electrical shorting system, according to one example embodiment.

Illustrative embodiments of the invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the systems and methods described herein provide systems, methods, and apparatus for lifting brushes and/or for shorting slip rings of a WRIM after the WRIM achieves a predetermined speed. By lifting the brushes from the slip rings and achieving an electrical short circuit between the slip rings according to these methods and systems, unnecessary wear on the brushes and rings can be avoided. According to one embodiment, the multiple brushes are positioned at locations around the slip rings of the WRIM, each brush being positioned for selective contact with a respective slip rings. In one configuration, there are three slip rings, one for each phase of a three-phase WRIM, and each in electrical communication with a rotor winding of the WRIM. In addition to the multiple brushes, multiple electrical contacts are provided that are in electrical contact with the rotor windings and configured to selectively provide electrical short circuits between the slip rings to the rotor windings. An actuating mechanism is provided in operable communication with the brushes and the electrical contacts, which, when actuated, close the electrical contacts to create electrical shorts between the slip rings to the rotor windings of the WRIM and lift the brushes from contacting the slip rings. Thus, at or near shorting of the slip rings by closing the electrical contacts, the brushes are lifted from contacting the slip rings to reduce unnecessary wear and the resulting system maintenance.

According to one embodiment, three brushes are operably connected together to form a brush group (e.g., a "three brush group"), each brush of the three brush group aligning with a different one of three slip rings (e.g., when utilized in a three-phase WRIM). There may be any number of brush groups as desired, which may depend, at least in part, on the level of current to be delivered to the slip rings via the brushes—the greater the current, the more brush groups are included. Each brush may be retained by a brush holder apparatus that allows adjusting the position of the brush with respect to the slip rings. In addition, each brush of a brush group may be operably connected to the same rotatable brush shaft via its brush holder. To lift or apply the brushes to the slip rings, the actuating mechanism according to this embodiment rotates the shaft on which the brush holders are mounted, which in turn rotates each of the three brush holders to lift (or lower) each of the three brushes from the slip rings.

According to one embodiment, rotation of the brush shafts is accomplished by rotating a brush actuating ring to which each of the brush shafts is operably connected (e.g., via a pivot arm). The brush actuating ring is concentric with the slip rings and rotated by the actuating mechanism when lifting (or lowering) the brushes is desired. Any number of techniques may be employed by the actuating mechanism to rotate the brush actuating ring, as described in more detail below. For example, according to one embodiment, the actuating mechanism includes a chain or belt drive that is connected to a slotted cam that drives the concentrically positioned actuating ring. The actuating mechanism may be motor driven and/or manually operated, according to various embodiments.

In addition to selectively lifting (or lowering) the brushes from contacting the slip rings, the actuating mechanism is operable to, at or near the same time (typically just prior to or simultaneously), short the slip rings by manually closing the circuit of the electrical contact members. According to one embodiment, the electrical contacts are formed by multiple slip ring contacts in electrical communication with respective terminals of the rotor windings and multiple separate contact connectors that are operable to selectively engage and disengage from respective slip ring contacts. In one embodiment, multiple contact connectors are spaced apart in a circular orientation, and each slip ring contact extends in the axial direction (e.g., out of an imaginary plane created by the slip rings) away from the WRIM. Each contact connector is associated with a corresponding contact connector that is positioned in a circular orientation and opposite the corresponding slip ring contact and extending in the axial direction (toward the slip ring contact and toward the WRIM). Thus, to short the slip rings, according to this embodiment, the actuating mechanism causes the contact connectors to move axially toward the corresponding slip ring contacts and engage them, which closes the electrical circuit and shorts the slip rings.

In one embodiment, the slip ring contacts are formed as posts extending in the axial direction and the contact connectors are formed as cylindrical sleeves oriented to receive corresponding slip ring contacts to make an electrical connection and close the circuit. According to other embodiments, the slip ring contacts and contact members may be formed in any number of suitable configurations to allow selective engagement and disengagement to form and break an electrical connection.

In one embodiment, the slip ring contacts may be affixed radially around the shaft and rotate with the slip rings. Thus, the corresponding contact connectors are also positioned radially around the shaft and rotate with the plurality of slip rings. In this embodiment, to create the electrical short, the actuating mechanism urges the contact connectors in the axial direction while they are spinning at rotational speed as the corresponding slip ring contacts. To do this, according to one embodiment, the actuating mechanism includes a translation means that translates rotational movement of the contact connectors to axial movement toward the corresponding slip ring contacts. The translational means may be achieved according to any number of techniques, including, but not limited to, a screw drive, worm gear, and the like.

Accordingly, example embodiments described herein allow selectively controlling the position of the brushes and the creation of an electrical short between the slip rings, such as would be desired when the WRIM achieves a predetermined operation (e.g., predetermined speed, sufficient levels of torque obtained, etc.). The actuating mechanism, which may be manually controller or controlled electronically, can synchronize the lifting of the brushes and shorting of the slip rings, simplifying the operation of the WRIM and reducing excessive wear on motor components.

Figure 2:
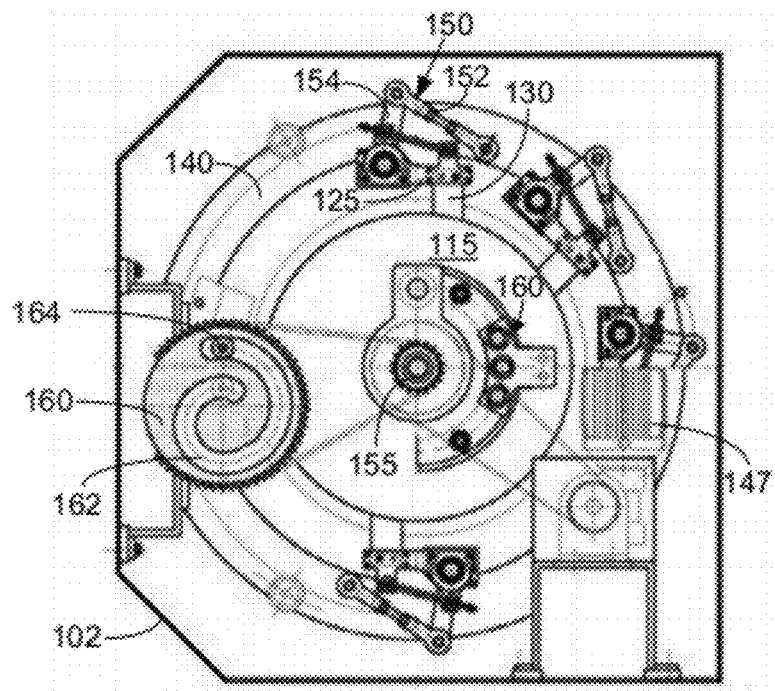
FIGS. 2-3 are cross-sectional end view schematic representations of a brush lifting and electrical shorting system, according to one example embodiment.
Figure 3:
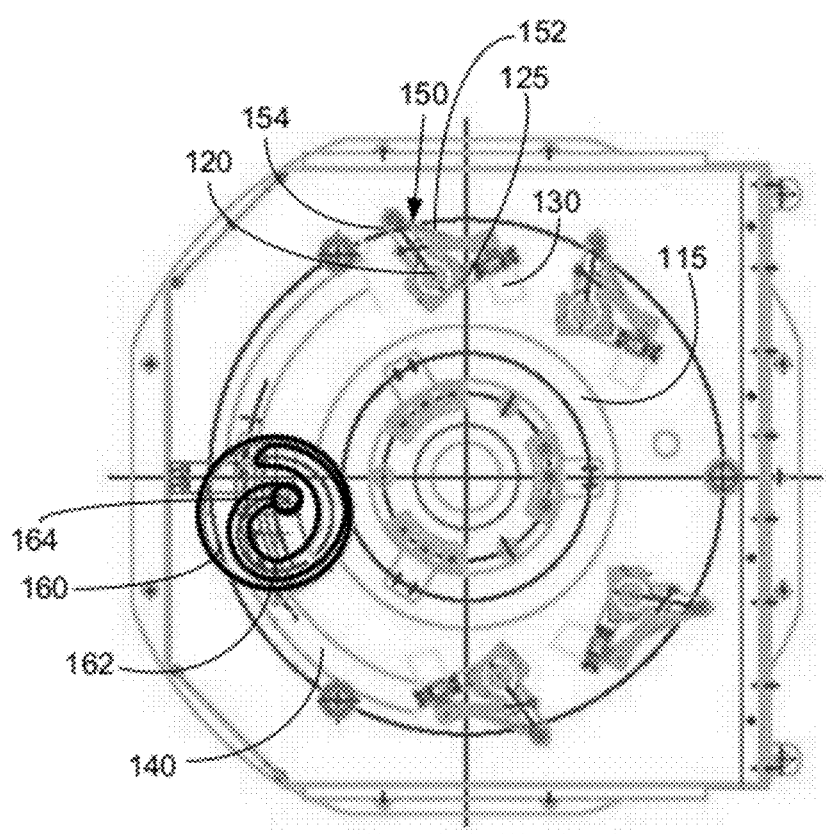

FIG. 1 illustrates a partial side cross-section schematic representation of a cage 102 attached to a WRIM 105 and including a brush lifting and electrical shorting system 100, according to one embodiment. FIGS. 2-3 illustrate a partial front end cross-section schematic representation of the same brush lifting and electrical shorting system 100. According to the embodiment illustrated by FIGS. 1 and 2-3, a shaft 110 is in operable communication with the rotor of the WRIM 105 and extends into the cage 102. In one embodiment, the shaft 110 and the rotor of the WRIM 105 are formed together. According to other embodiments, the shaft 110 may be subsequently applied, such as when retrofitting an existing WRIM with the brush lifting and electrical shorting assembly 100. Mounted radially around, and concentric with, the shaft 110 are one or more slip rings 115. According to the embodiment shown, three slip rings 115a, 115b, 115c are mounted to the shaft 110, each slip ring 115a, 115b, 115c associated with a respective winding of a three-phase WRIM 105. The various aspects of the brush lifting and electrical shorting system 100, including the brush lifting system, the brush holder design, the electrical shorting system, and methods associated therewith, are described individually below.

Brush Lifting System

The brush lifting and electrical shorting system 100 further includes one or more brush shafts 120, each brush shaft 120 having three brush holders 125 securing corresponding brushes 130 mounted thereto. As discussed above, a shaft having multiple brush holders and brushes mounted thereto can together be referred to as a brush group. In other examples, each brush shaft 120 may have fewer or more than three brushes 130 and brush holders 125, such as when not used with a three-phase system. Each brush 130 is aligned with a respective slip ring 115 and each brush shaft 120 is secured in a fixed position relative to the cage 102. As the slip rings 115 rotate, the brushes 130 generally remain in place (with the exception of pivoting or rotating to lift them from the slip rings 115, or for adjustment, as described herein). According to one embodiment, a brush shaft 120 is secured directly to the cage 102 or to a plate or other member that is in turn secured to the cage 102. It is appreciated that the means for securing the brush shafts 120 to the cage still allow for rotational movement of the brush shafts around an axis of rotation formed through or along the length of the brush shaft 120, which can be accomplished using an actuating mechanism 145 as described in more detail below.

As can be seen in FIGS. 2-3, multiple brush shafts 120 and corresponding brush holders 125 and brushes 130 (brush groups) can be located in a radially spaced apart orientation around the slip rings 115. Any number of brush groups may be included. For example, in one embodiment, the greater the levels of current to be delivered via the brushes 130 to the slip rings 115, the more brush groups are provided. It is further appreciated that, according to other embodiments, fewer than (or more than) three brush holders 125 and brushes 120 may be provided with each brush shaft 120, such as if there are fewer than (or more than) three slip rings 115 used. Additional details regarding the brush holder 125 and brush shafts 120 are provided with reference to FIGS. 4-9 below.

Also shown in FIG. 1 are multiple insulating shields 135 positioned between each of the brush holders 125 and brushes 130, which provides electrical insulation between the respective phases to prevent an electrical short between the slip rings 115. According to one embodiment, the insulating shields 135 are mounted to a shaft which is in turn mounted to a cage 102 housing the brush lifting and electrical shorting system 100. Though, any other means for mounting the insulating shields 135 may be used.

Figure 8:
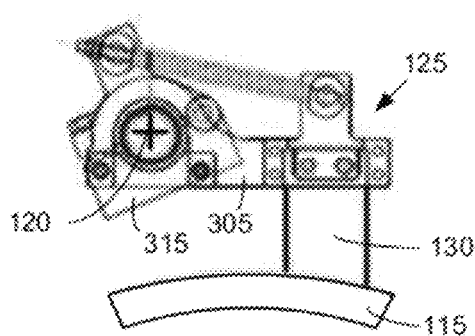
Figure 9:
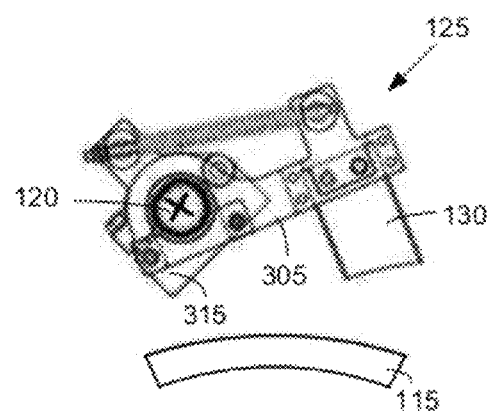

With reference to both FIGS. 1 and 2-3, a brush actuating ring 140 is positioned concentric with the shaft 110; though, it is not connected to the shaft 110 and does not rotate therewith. The brush actuating ring 140 may be rotatably secured to the cage housing the brush lifting and electrical shorting system 100, and in operable communication with the actuating mechanism 145 and with each brush shaft 120 housing the brush groups. Accordingly, by rotating the brush actuating ring 140, each brush shaft 120 is rotated, which in turn causes the brush holders 125 and brushes 130 to pivot and lift (or lower) relative to the slip rings 115. FIG. 2 illustrates the brushes 130 in a lowered position touching the slip ring 115, while FIG. 3 illustrates the brushes 130 in a raised position and free of the slip ring 115. FIGS. 8-9 similarly illustrate the brush holder 125 and brush 130 in a raised position and a lowered position, respectively, with respect to the slip ring 115.

Figure 5:
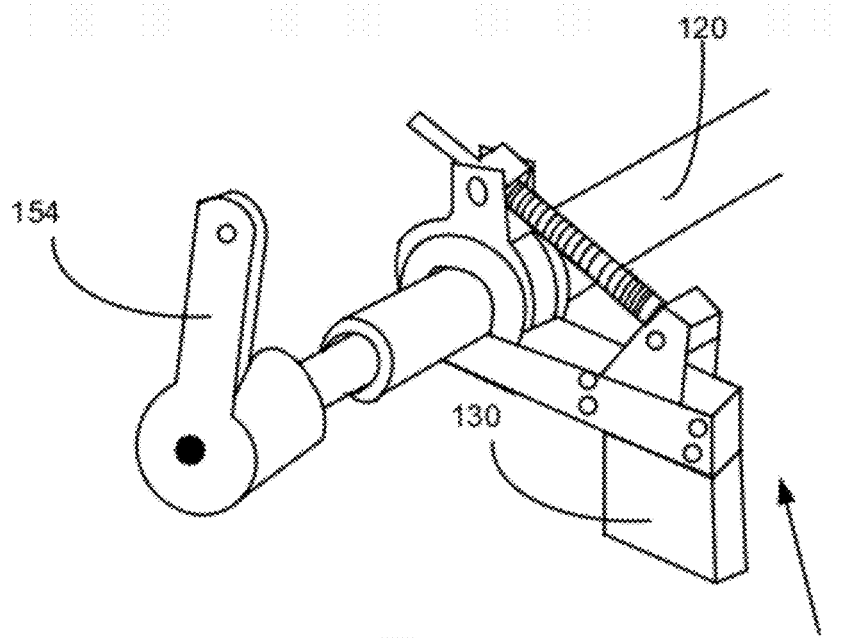

According to one embodiment, the brush actuating ring 140 is operably connected to each of the brush shafts 120 by a separate pivot arm assembly 150. According to the embodiment shown in FIGS. 1 and 2-3, the pivot arm assembly 150 includes a first arm member 152 and a second arm member 154. The first arm member 152 is pivotably secured to the brush actuating ring 140 and to one end of the second arm member 154. The opposite end of the second arm member 154 is fixedly secured to the brush shaft 120. Thus, as the brush actuating ring 140 rotates in a first direction, the first arm member 152 exerts torque on the second arm member 154, which in turn causes the brush shaft 120 to rotate along its axis, serving as the fulcrum for the second arm member 154. The brush shaft 120, thus, rotates in the same rotational direction that the brush actuating ring 140 rotates. Likewise, when rotating the brush actuating ring 140 in a second, opposite direction, the brush shaft 120 rotates in the same, opposite direction than before. FIG. 5 shows a perspective view of the second arm member 154 of an example pivot arm assembly 150 in communication with a brush shaft 120 having a brush holder 125 mounted thereto.

With continued reference to FIGS. 2-3, rotating the brush actuating ring 140 in the counter-clockwise direction would cause the brush shafts 120 to rotate in the counter-clockwise direction, which in turn would cause each attached brush holder 125 to serve as a lever and lift each brush 130 from the slip ring 115. To engage the brushes 130 with the slip rings 115, as shown in FIG. 2, the brush actuating ring 140 is rotated in the clockwise direction. It is appreciated that the orientation of the components and their relative attachments to the brush actuating ring 140 may differ from that shown in FIGS. 1 and 2-3, such as may result in opposite results when rotating clockwise or counter-clockwise. Moreover, while the brush actuating ring 140 is operably connected to the brush shafts 120 by pivot arm assemblies 150 having two arm members 152, 154, any number of suitable techniques to cause rotation of the brush shafts 120 may be used, such as, but not limited to, gearing, belts, crank, cam, actuator, and the like.

The brush actuating ring 140 is rotated generally by the actuating mechanism 145. According to the embodiment shown in FIGS. 1 and 2-3, the actuating mechanism 145 includes multiple belt and pulley or chain and gear drives with an originating driving force applied by a motor 147 and/or by a manual crank 149. For example, the motor 147 or crank 149 drives a first gear or pulley system 155, which in turn drives a slotted cam gear system 160. The slotted cam gear system 160 includes a spiral slot 162 that interfaces with a drive 164 shaft operably connected to the brush actuating ring 140 in a fixed relationship. Thus, when the slotted cam gear system 160 is turned, the spiral slot 162 causes movement of the drive shaft 164 that translates into rotational movement of the brush actuating ring 140 along approximately the same axis of rotation as the shaft 110. Accordingly, by rotating the actuating ring 140, each of the brushes 130 are simultaneously lifted from the slip rings 115 or lowered to the slip rings 115.

It is appreciated that the embodiment of the actuating mechanism 145 shown and described with reference to FIGS. 1 and 2-3 is provided for illustrative purposes and is not intended to be limiting. Other example techniques for providing rotational motion to the brush actuating ring 140 include, but are not limited to, worm gear, crank, cam and follower, and the like.

Brush Holder Apparatus

Figure 4:
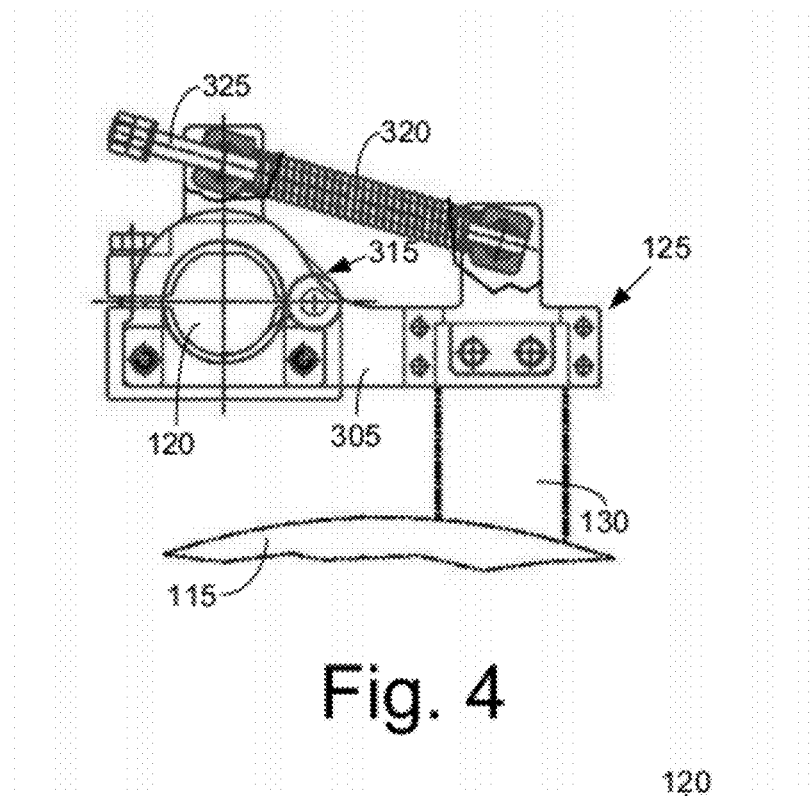
FIGS. 4-5 are schematic and perspective representations of a brush holder apparatus, according to one example embodiment.

FIG. 4 illustrates an example brush holder 125 and brush 130, according to one embodiment. According to this embodiment, the brush holder 125 includes an arm 305 having an opening 310 on one end and a housing securing the brush 130 on the opposite end of the arm 305. The opening 310 retains a collar 315 for securing the brush holder 125 around a brush shaft 120 (shown in cross-section positioned within the collar). In addition, a spring 320 is connected between the arm 305 and the collar 315, which has an adjustable tension to permit adjusting the angular position of the brush 130 relative to the brush shaft 120. The brush holder 125 also includes the electrical contacts (not shown) that are attachable to an external power supply for delivering a desired current to the slip rings 115 via the brush 130 during start-up of the WRIM.

FIG. 5 illustrates a perspective view of the brush holder 125 mounted to the shaft 120 via the collar 315. At the end of the shaft 120 is a second arm 154 of the pivot arm assembly 150 described above, which is in operable communication (e.g., via a first arm 152) an actuating ring for causing rotational movement of the shaft 120.

Figure 6:
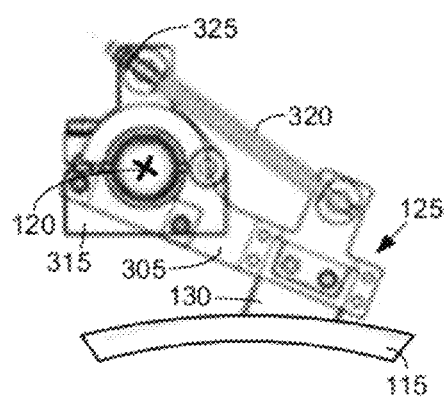
FIGS. 6-9 are schematic representations of a brush holder apparatus, according to one example embodiment.
Figure 7:
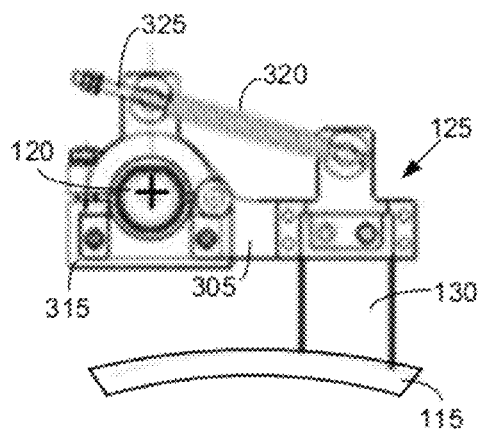

The tension of the spring 320 on the brush holder 125 may be adjusted according to any number of adjustment mechanisms. In one embodiment, as shown in FIGS. 6-7, an adjustment mechanism may include a shaft 325 passing through the spring 320 with one end slideably attached to the collar 315 and the other end attached to the arm 305 in a fixed relationship. Thus, when sliding the shaft 325 toward the collar 315, the spring 320 is compressed, tension is increased, and the arm 305 rotates around the axis of rotation of the brush shaft 120, resulting in the brush 130 being lifted. Likewise, when sliding the shaft 325 away from the collar 315, increasing its relative length, the arm 305 rotates around the brush shaft 120 in the opposite direction, lowering the brush 130. FIG. 6 shows the spring 320 and shaft 325 significantly extended between the arm 305 and the collar 315, lowering the brush 130 toward the slip ring 115. This may be desirable when the brush 130 has been exposed to a significant amount of friction and wear that is to be accounted for to remain aligned with the slip ring 115. FIG. 7 shows the shaft 325 extended toward the collar 315, reducing the effective length of the shaft 325 and tightening the spring 320. In this configuration, the arm 305 rotates upward around the axis of rotation defined by the brush shaft 120 and lifts the brush 130 in the direction away from the slip ring 115. Adjusting the brush holder 125 in this manner may be desirable to achieve initial alignment of the brush 130 with the slip ring, such as when the brush 130 has not been exposed to significant wear. Accordingly, an adjustable brush holder 125 that provides for selective positioning of the brush relative to the slip ring 115 reduces the amount of brush maintenance and replacement costs, by accommodating brush 130 wear without having to replace the brush 130. Instead of replacing the brushes, the adjustable brush holder 125 may simply be adjusted to realign the brush 130 with the slip ring 115 give the brush's 130 current state.

According to one embodiment, the shaft 325 may have one threaded end that is threaded retained by the collar 315, and the other end rotatably retained by the brush holder arm 305. Thus, the effective length of the shaft 325 between the arm 305 and the collar 315 can be adjusted by threading the shaft 325 in or out of the collar 315. However, any number of other means for adjusting the length of the shaft 325, and or the tension of the spring 320 can be provided. As one other example, a shaft 325 may include multiple pin holes along its length and a pin or pins that secure the shaft 325 to the collar 315, allowing for adjusting the effective length of the shaft 325 by the location of the pin hole selected. According to yet another embodiment, a tension clip may be adjustably secured to the collar 315 and either the spring 320 or the arm 305. Adjusting the tension on the tension clip and/or the location to which it attaches relative to the collar 315 will serve to adjust the tension on the spring 320, thus adjusting the brush 130 position. In yet other embodiments, a spring may not be included, but the angle of the arm 305 relative to the collar 315 may be adjusted using a selectably adjustable solid member positioned between the collar 315 and the arm 305.

FIG. 8 illustrates a side view of the brush holder 125 mounted on the brush shaft 120, positioned with the brush 130 in contact the slip ring 115, such as during start-up of the WRIM. FIG. 9 illustrates the same side view of the brush holder 125, showing shaft rotating (counter-clockwise in this example), which in turn causes the collar 315, the brush shaft 120, and the arm 305 to rotate around the axis of the brush shaft 120 in the same direction, lifting the brush 130 from the slip rings.

Electrical Shorting System

In addition to lifting the brushes 130, the actuating mechanism 145 is operable to selectively close the electrical contacts 160 to short the slip rings 115. According to the embodiment shown in FIG. 1, and shown in more detail by FIGS. 10-12, the electrical contacts 160 are formed by multiple slip ring contacts 162 (e.g., posts, etc.) in electrical communication with respective terminals of the rotor windings and multiple separate contact connectors 164 (e.g., sleeves, etc.) that align with the slip ring contacts 164 and that selectively engage with and disengage from respective slip ring contacts 162. In this embodiment, each slip ring contact 162 may be mounted to, or otherwise extend from, a plate 163 and positioned axially or in an approximately circular orientation. Each slip ring contact 162 extends in the axial direction (e.g., out of an imaginary plane created by the slip rings and approximately parallel to the shaft 110) away from the WRIM 105. Each contact connector 164 is positioned opposite a corresponding slip ring contact 162, and extends in the axial direction (e.g., approximately parallel to the shaft 110) toward the corresponding slip ring contact 162 and toward the WRIM 105. As shown in FIGS. 11-12, the contact connectors 164 may likewise be mounted to a plate 165.

In one embodiment, the slip ring contacts 162 and corresponding contact connectors 164 are spaced apart and arranged radially around the shaft 110. There may be any number of electrical contacts 160 according to various embodiments. For example, a fixed number of electrical contacts can be provided that is dependent upon the amount of rotor current expected and/or the number of slip rings provided. In the example shown in FIG. 10, there are nine electrical contacts 160, three associated with each of three ship rings. However, it is appreciated that this embodiments is provided for illustrative purposes and any number greater than or less than that shown may be provided as desired.

According to one embodiment, the electrical contacts 160 are in electrical communication with the rotor windings of the WRIM 105 by the electrical connection 165 leading from a plate to which the slip ring contacts 162 are secured to the rotor windings (not shown) of the WRIM. It is appreciated, however, that any number of means may be used to provide electrical communication between the electrical contacts 160 and the rotor windings of the WRIM 105.

Figure 10:
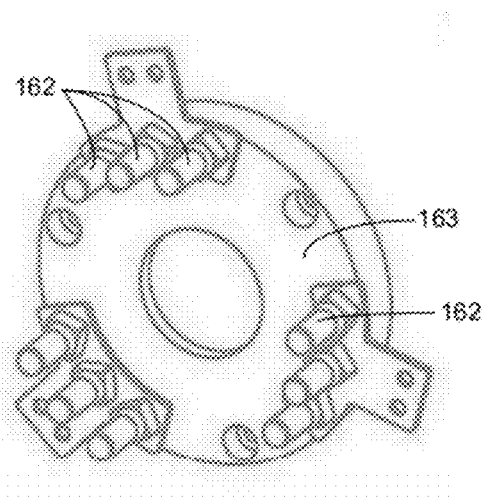
FIGS. 10-12 are schematic and perspective representations of an electrical shorting system, according to one example embodiment.
Figure 11:
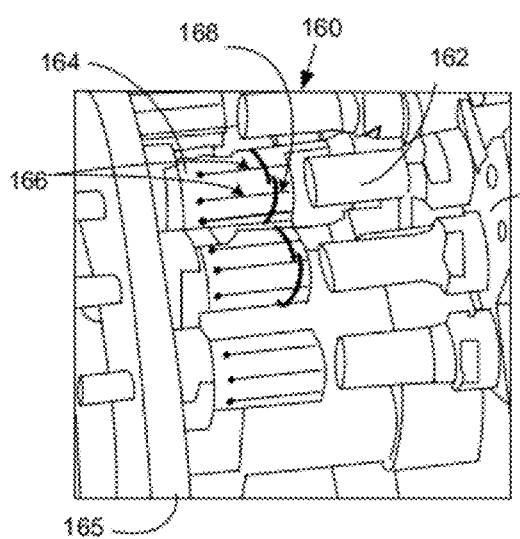
Figure 12:
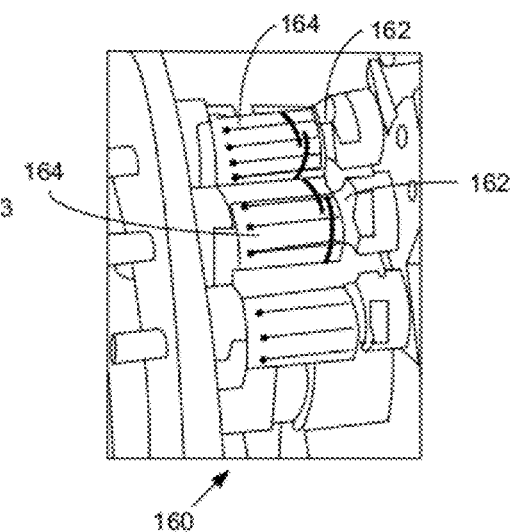

In one embodiment, as shown in more detail in FIGS. 10-12, each slip ring contact 162 is formed as a post extending in the axial direction, such as a cylindrical post. Each corresponding contact connector 164 can be, thus, formed as a sleeve having an opening facing the corresponding slip ring contact 162. In one embodiment, the sleeve may be formed as a cylindrical sleeve having an inner diameter the same or slightly larger than the outer diameter of the slip ring contact 162 posts, providing a tight fit therebetween when engaged. Moreover, in one embodiment, each contact connector 164 sleeve may have at least one slit 166 formed from the opening and extending a distance along at least a partial length of the sleeve. The slit(s) 166 allow the contact connector 164 sleeve to open and expand to receive the corresponding slip ring contact 162 post. For example, if the contact connectors 164 do not align exactly with the slip ring contacts 162 when urging the contact connectors 164 toward the slip ring contacts 162, the slit(s) 166 accommodate the slight misalignment and still allow slideably engaging the contact connector 164 sleeves with the slip ring contact 162 posts. In addition to the slit(s) 166, one or more compression rings 168 may be placed over each contact connector 164 sleeve and around the slit(s) 166. The compression ring(s) 168 apply an inward radial compressive force, maintaining a tight fit between the sleeves and the slip ring contacts 162 once engaged.

Being operably connected to the shaft 110, the slip ring contacts 162 and the contact connectors 164 spin with the shaft 110 and at the same rotational speed as the slip rings 115. Accordingly, to close the connection to create the electrical short, the contact connectors 164 are to be urged toward and engage with the slip ring contacts 162 while both are spinning with the shaft 110. According to one embodiment, the actuating mechanism 145 includes a translation mechanism 170 that enables the contact connectors 164 to spin with the shaft 110 while also translating rotational movement from the first gear or pulley 155 (driven by the motor 147 or hand crank 149) to an axial movement in the direction toward the slip ring contacts 162. The translational mechanism 170 may be achieved according to any number of techniques, including, but not limited to, screw drive, worm drive, electromagnetic operation, actuator, and the like.

Figure 13:
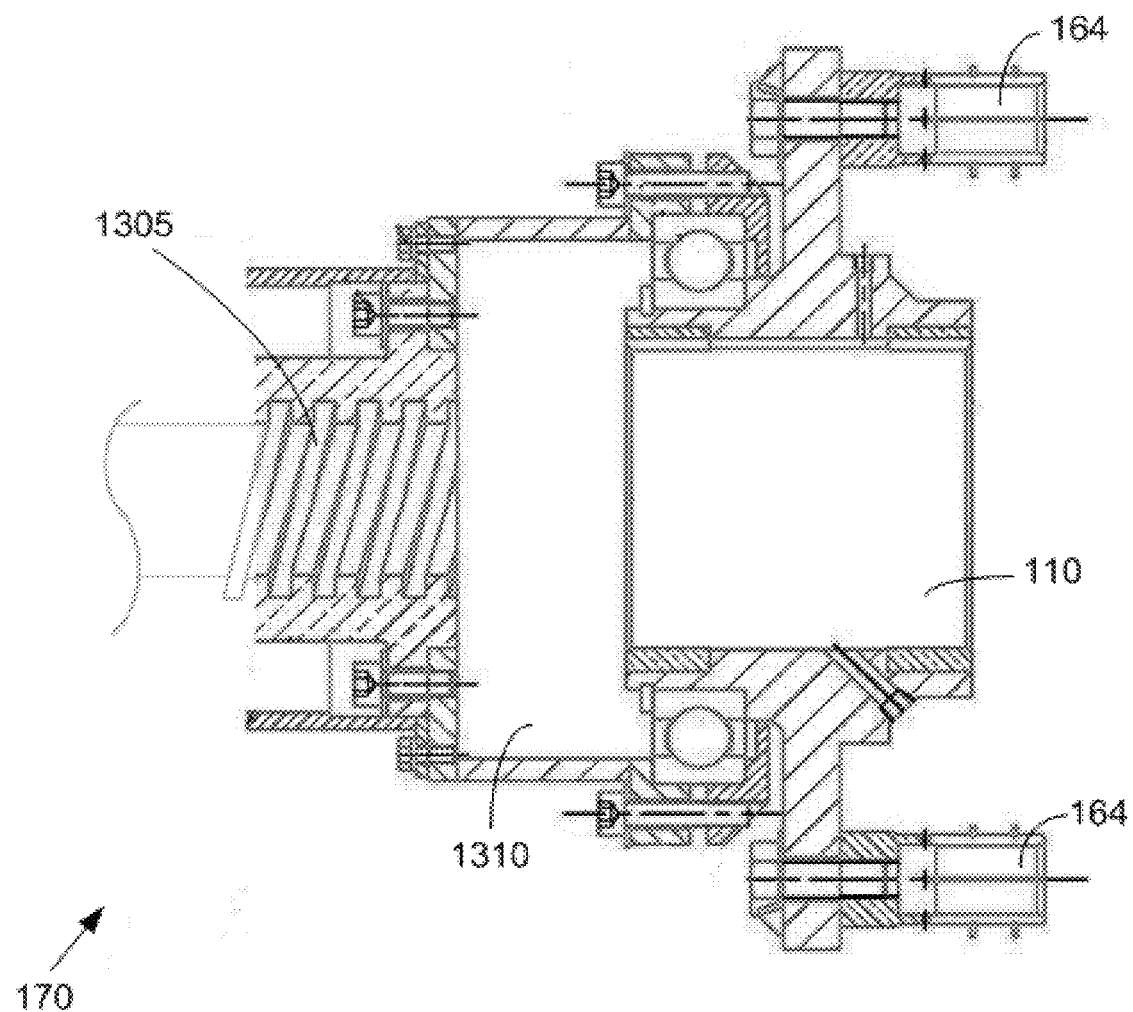
FIG. 13 is a cross-sectional side view schematic representation of a translational mechanism, according to one example embodiment.

FIG. 13 illustrates an example partial view of a translation mechanism 170 having a screw drive 1305 which is operably driven as part of the actuating mechanism 145. For example, as can be seen if FIGS. 1 and 2, the gear or pulley system 155 driven by the motor 147 or crank 149 provides rotational energy to the screw drive 1305 in mechanical relationship with a connector housing 1310, which operably causes a translational movement of the connector housing 1310 in the axial direction. The connector housing 1310 is in fixed relationship with each of the contact connectors 164, such that urging the connector housing 1310 by the screw drive 1305 also moves the contact connectors 164 axially, to allow engaging and disengaging the corresponding slip ring contacts. Moreover, according to various embodiments, the connector housing 1310 is in fixed relationship with the shaft 110 such that it rotates at or near the same speed of the shaft, even though the screw drive 1305 allows translational movement while the connector housing 1310 is rotating. In one embodiment, translational movement is provided by the screw drive 1305 (e.g., a worm gear, etc.) that urges the contact connectors 164 toward the corresponding slip ring contacts. It is appreciated, however, that any other means to cause translational movement to the contact connectors 164 while permitting rotation with the shaft 110.

With continued reference to FIGS. 11-12, an example partial view of the brush lifting and electrical short system 100, showing the electrical contacts 160 in open and closed positions, respectively. FIG. 11 shows the contacts 160 in open position, such as if the brushes are contacting the slip rings (not shown). FIG. 12 illustrates the same partial view of the brush lifting and electrical short system 100, showing the electrical contacts 160 in closed position, shorting the slip rings (not shown). As shown in FIG. 12, the slip ring contacts 162 fit within the contact connectors 164 when the contact connectors 164 are urged toward the slip ring contacts 162, which closes the electrical circuit and creates a short between the slip rings and the rotor windings of the WRIM.

Accordingly, the brush lifting and electrical short system 100 allows selectively controlling the position of the brushes 130 relative to the slip rings 115 and selectively causing an electrical short between the slip rings 115 and the rotor. In operation, during start-up of the WRIM, the brushes 130 would be positioned in the engaged or down position, contacting the respective slip rings 115, and the desired levels of current delivered therethrough from an external power source. After the WRIM has achieved a predetermined level of operation, which may be, but is not limited to, a predetermined speed (e.g., revolutions per minute, etc.), a predetermined torque output, after a predetermined period of time, or any combination thereof or similar operation states, an electrical short between the slip rings 115 is created by engaging the electrical contacts 160 and the brushes 130 are lifted from the slip rings 115 by pivoting the brush holders 120.

In one embodiment, the above-described operations may be controlled, at least in part, automatically, such as by a computer processor-based controller 180 operable for determining WRIM operating state and operating a motor 147 of the actuating mechanism 145. It is appreciated that the controller 180 may be any processor-based controller, as is described in more detail with reference to FIG. 16.

In another embodiment, these operations may be manually controlled, such as by a system operator operating the manual crank 149. In one embodiment, the system is operable for both manual and automatic control, and an operator may select to do so by placing the motor 147 and/or controller 180 in an on or off state. In other embodiments operable for manual control, the actuating mechanism 145 may be driven by a crank 149 only, and a motor 147 may not be included.

Figure 14:
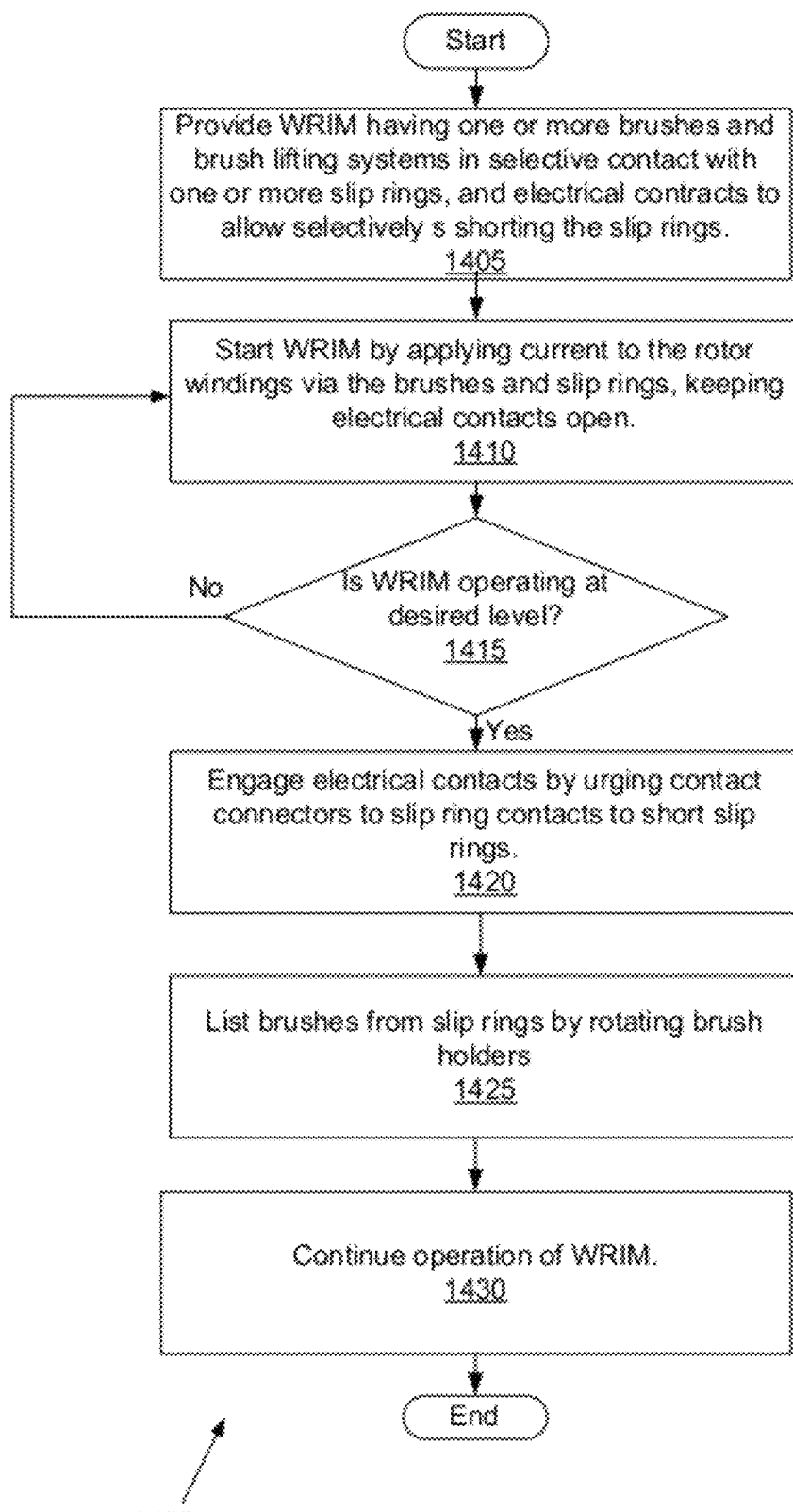
FIG. 14 illustrates a flowchart of a method for operating brushes and slip rings, according to one example embodiment.

FIG. 14 illustrates a flowchart of an example method 1400 of operating a WRIM having a brush lifting and electrical short system, according to one embodiment. The method may begin at block 1405, in which a WRIM is provided that includes a brush lifting and electrical short system, such as is described with reference to FIGS. 1-13. At block 1410, the WRIM is started by delivering electrical current to the rotor windings of the WRIM by one or more brushes in contact with one or more slip rings. Thus, at block 1410, the brushes are in contact with the slip rings as the slip rings rotate, such as is shown in FIGS. 2 and 8, while the electrical contacts are not closed or connected, such as is shown in FIG. 11.

Following block 1410 is decision block 1415, in which it is determined whether the WRIM is operating at the desired level (e.g., speed, torque, output, for a predefined period of time, etc.). As described above, in one embodiment, the determination may be made, at least in part, by a controller operable to measure the operation of the WRIM. The controller may indicate to the operator the operating state of the WRIM, and/or the controller may proceed to automatically instruct the desired actions when the WRIM meets or exceeds the predetermined operating level. If the WRIM is not yet reached the desired operating level, then operations continue with current being delivered via the brushes in contact with the slip rings.

If, however, it is determined that the WRIM is operating at or above the desired operating level (or any other determination is made to alter the operation), then operations continue to block 1420. At block 1420, the actuating mechanism engages the electrical contacts to create an electrical short between the slip rings and the rotor windings, such as is described with reference to FIGS. 1, 2-3, and 10-13. As explained, the actuating mechanism may be automatically controlled, such as by the controller and an electric motor, or it may be manually controlled, such as by a manual crank or other mechanism to rotate the components of the actuating mechanism. In addition to engaging the electrical contacts, the actuating mechanism lifts the brushes from contact with the slip rings at block 1425. For example, this is accomplished by rotating brush shafts holding one or more brushes by the actuating mechanism (e.g., a slotted cam drive), as described with reference to FIGS. 1-9. After the short is created between the slip rings and the brushes are lifted, the WRIM may then continue to operate at full speed according to its normal operating profile at block 1430.

The method 1400 may therefore end after block 1430, having started a WRIM by initially delivering electrical current to the rotor windings via brushes and slip rings, and then shorting the slip rings and lifting the brushes therefrom when a sufficient magnetic field exists in the windings, reducing the amount of wear, maintenance, and long-term cost associated with a brush and slip ring configured WRIM. It is appreciated that the method 1400 described with reference 1400 is provided for illustrative purposes, and that any number of different operations, sequences, and/or adjustments to the method may be provided, as would be appreciated in light of the foregoing.

Figure 15:
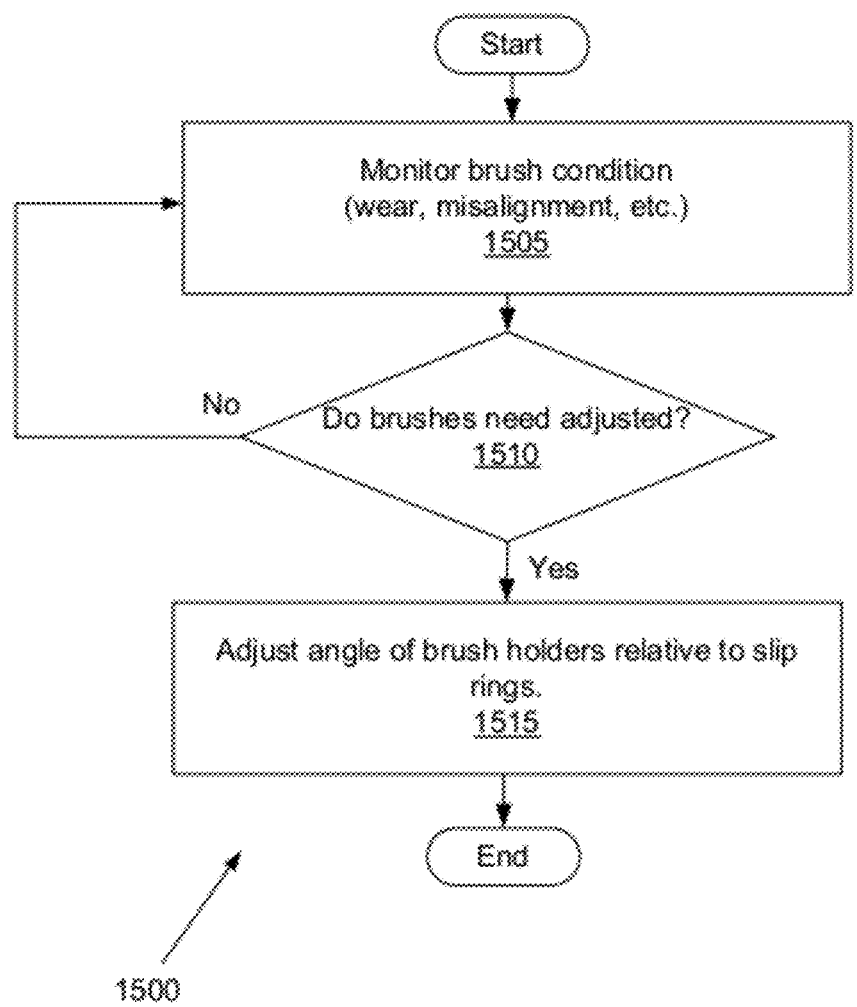
FIG. 15 illustrates a flowchart of a method for adjusting brushes for use with slip rings, according to one example embodiment.

FIG. 15 illustrates flowchart of an example method 1500 of adjusting brush placement for use in a brush lifting and electrical short system, according to one embodiment. The method may begin at block 1505, in which the brush conditions are monitored. This may be performed during operation, after shut-down, and/or prior to start-up. Conditions may include brush wear, brush alignment with the slip rings, and the like. At decision block 1510, it is determined whether one or more brushes need adjusted. If no brushes need adjusted, then operations repeat to block 1505 for the next opportunity to monitor brush condition. If, however, it is determined that one or more brushes need adjusted, then block 1515 follows. At block 1510, the angle of the brush holder relative to the corresponding slip ring, and thus the alignment of the brush with the slip ring, is adjusted. The brush holder may be an adjustable brush holder, such as is described with reference to FIGS. 4-9. Thus, the angle of the brush holder may be adjusted by any of the adjustment mechanisms described herein, such as adjusting the tension of a spring between the arm of the brush holder and the collar securing the brush holder to the brush shaft. Increasing tension may serve to lift the brush from the slip rings, decreasing tension may serve to lower the brush toward the slip rings. Thus, when a brush is significantly worn, such that there is little or no contact with the slip ring, tension may be decreased to pivot the brush holder toward the slip ring and restore contact of the brush with the slip ring. Using an adjustable brush holder reduces the expenses incurred with brush replacement.

The method 1500 may end after block 1515, having adjusted one or more brush positions relative to the slip rings of a WRIM. This method may be repeated for each brush utilized with the WRIM, and be performed over the life of the WRIM, to ensure efficient delivery of current during start-up and to minimize maintenance and replacement costs associated with brush wear.

Figure 16:
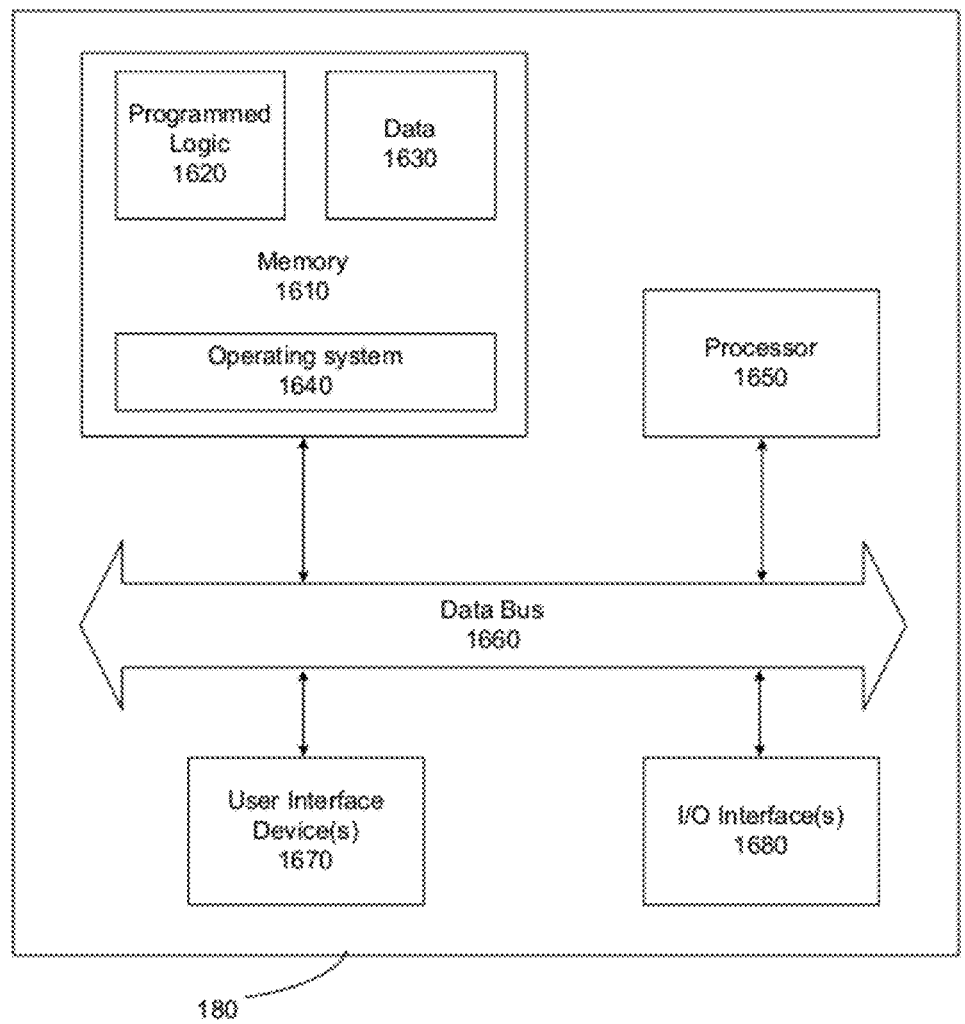
FIG. 16 is a schematic representation of a controller, according to one example embodiment.

FIG. 16 illustrates by way of a block diagram an example controller 180 used to monitor WRIM operation and facilitate operating the brush lifting and electrical short system, according to an illustrative embodiment. More specifically, the elements of the computerized controller 180 may be used to monitor the operating state of the WRIM during start-up, for example, to determine when brushes are to be lifted from the slip rings and electrical shorts created. In addition, the controller 180 may generate a control action to activate the actuating mechanism of the brush lifting and electrical short system, such as to power an electric motor if performed automatically. The computerized controller 180 may include a memory 1610 that stores programmed logic 1620 (e.g., software) and may store data 1630. The memory 1610 also may include an operating system 1640. A processor 1650 may utilize the operating system 1640 to execute the programmed logic 1620, and in doing so, also may utilize the data 1630. A data bus 1660 may provide communication between the memory 1610 and the processor 1650. Users may interface with the controller 180 via at least one user interface device 1670 such as a keyboard, mouse, control panel, or any other devices capable of communicating data to and from the controller 180. The controller 180 may be in communication with the WRIM while operating, as well as in communication with the WRIM while not operating, via an I/O Interface 1680. Additionally, it should be appreciated that other external devices, multiple other WRIMs, and or other components associated therewith may be in communication with the controller 180 via the I/O Interface 1680. In the illustrated embodiment, the controller 180 may be located remotely with respect to the WRIM; although, it may be co-located or even integrated with the WRIM. Further the controller 180 and the programmed logic 1620 implemented thereby may include software, hardware, firmware, or any combination thereof. It should also be appreciated that multiple controllers 180 may be used, whereby different features described herein may be executed on one or more different controllers 180.

Accordingly, embodiments described herein provide systems, methods, and apparatus for lifting brushes and/or for shorting slip rings of a WRIM after the WRIM achieves a predetermined speed, achieving the technical effect of efficient start-up control for the WRIM. By lifting the brushes from the slip rings and achieving an electrical short circuit between the slip rings, the technical effect of avoiding unnecessary wear on the brushes and rings is achieved. Moreover, the unique configuration of the brush holder assemblies achieve the technical effect of providing adjustable brush assemblies and extends the life of brush assemblies by allowing adjustment after brush wear to maintain desired contact with slip rings.

References are made to block diagrams of systems, methods, apparatuses, and computer program products according to example embodiments of the invention. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based, or programmable consumer electronics, mini-computers, mainframe computers, etc.

Application programs that are components of the systems and methods described herein may include routines, programs, components, data structures, etc. that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the invention may be embodied in many forms and should not be limited to the example embodiments described above. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A brush lifting system for an induction motor, comprising:
   a shaft in operable communication with a wound rotor induction motor (WRIM) rotor;
   a plurality of slip rings positioned radially around the shaft and in electrical communication with rotor windings of the WRIM;
   a plurality of brushes, wherein each of the plurality of brushes is to selectively contact a respective one of the plurality of slip rings;
   a plurality of selectively activating electrical contacts in electrical communication with respective terminals of the rotor windings of the WRIM;
   an actuating mechanism in operable communication with at least a portion of the plurality of brushes and the plurality of electrical contacts, wherein, when the actuating mechanism is actuated, at least a portion of the plurality of electrical contacts creates electrical shorts between at least a portion of the plurality of slip rings and the rotor windings of the WRIM and at least a portion of the plurality of brushes is lifted from contacting the plurality of slip rings; and
   a respective one of a plurality of brush holders associated with each of the plurality of brushes; wherein:
   the plurality of brushes is configured into groups of brushes;
   each of the brush holders of the groups of brushes is operably connected to a same one of a plurality of shafts;
   each brush of each group of brushes is aligned with a respective one of the plurality of slip rings for selective contact therewith; and
   the actuating mechanism is to selectively apply rotational movement to each of the brush holders about the plurality of shafts to selectively engage and disengage the respective group from the plurality of slip rings.

2. The system of claim 1, wherein the plurality of slip rings comprises at least three slip rings, each slip ring corresponding to one of three phase windings.

3. The system of claim 1, wherein the WRIM is a three-phase induction motor.

4. The system of claim 1, wherein each of the plurality of shafts is insulated.

5. The system of claim 1, further comprising at least one brush actuating ring in operable communication with the actuating mechanism and the brush holders of the plurality of brushes, wherein the actuating mechanism to selectively rotate the brush actuating ring to apply rotational movement to each of the brush holders about the plurality of shafts.

6. The system of claim 5, wherein the actuating mechanism further comprises a slotted cam in operable communication with the brush actuating ring to rotate the brush actuating ring.

7. The system of claim 6, wherein the slotted cam is driven by one of: (a) an electric motor; or (b) a manually operated drive.

8. The system of claim 1, further comprising at least one insulating shield positioned at least partially between each pair of adjacent brushes.

9. The system of claim 1, wherein the actuating mechanism is operated by a controller, wherein, when the WRIM achieves a predetermined threshold, the controller causes the actuating mechanism to lift at least a portion of the plurality of brushes from contacting at least a portion of the plurality of slip rings and activates at least a portion of the plurality of electrical contacts to create electrical shorts between at least a portion of the plurality of slip rings and at least a portion of the rotor windings of the WRIM.

10. The system of claim 1, wherein the plurality of electrical contacts comprises a plurality of slip ring contacts in electrical communication with respective terminals of the rotor windings of the WRIM and a corresponding plurality of contact connectors, wherein, when actuated by the actuating mechanism, the plurality of contact connectors moves in an axial direction defined along the shaft toward the plurality of slip ring contacts and engages the plurality of slip ring contacts to create electrical shorts between the plurality of slip rings and the rotor windings of the WRIM.

11. A method for selectively engaging brushes with slip rings for an induction motor, comprising:
   providing a plurality of slip rings positioned radially around a shaft in operable communication with a wound rotor induction motor (WRIM) rotor, wherein the plurality of slip rings is in electrical communication with rotor windings of the WRIM;
   providing a plurality of brushes, wherein each of the plurality of brushes is to selectively contact a respective one of the plurality of slip rings;
   selectively creating electrical shorts between at least a portion of the plurality of slip rings and at least a portion of the rotor windings of the WRIM; and
   selectively lifting at least a portion of the plurality of brushes from at least a portion of the plurality of slip rings, wherein selectively lifting at least a portion of the plurality of brushes from the plurality of slip rings further comprises rotating a corresponding plurality of brush holders about a respective shaft, wherein each of the plurality of brush holders contains a respective one of the plurality of brushes.

12. The method of claim 11, further comprising rotating the plurality of brush holders by rotating a brush actuating ring in operable communication with each shaft to which one or more of the plurality of brush holders are mounted.

13. The method of claim 12, wherein rotating the brush actuating ring comprises selectively driving a slotted cam in operable communication with the brush actuating ring.

14. The method of claim 11, wherein selectively lifting at least a portion of the plurality of brushes from at least a portion of the plurality of slip rings is performed responsive at least in part to a driving force supplied by one of: (a) an electric motor; or (b) a manually operated drive.

15. The method of claim 11, wherein selectively creating electrical shorts between at least a portion of the plurality of slip rings and at least a portion of the rotor windings of the WRIM is performed responsive at least in part to the driving force supplied by one of: (a) an electric motor; or (b) a manually operated drive.

16. The method of claim 11, wherein selectively creating electrical shorts between at least a portion of the plurality of slip rings and at least a portion of the rotor windings of the WRIM further comprises moving a plurality of contact connectors toward a corresponding plurality of slip ring contacts in an axial direction defined along the shaft, wherein the plurality of slip ring contacts is in electrical communication with respective terminals of the rotor windings of the WRIM and the corresponding plurality of contact connectors, wherein, when the plurality of contact connectors moves axially toward the plurality of slip ring contacts and engages the plurality of slip ring contacts electrical shorts are created between the plurality of slip rings and the rotor windings of the WRIM.

17. The method of claim 11, wherein selectively creating electrical shorts between at least a portion of the plurality of slip rings and at least a portion of the rotor windings of the WRIM and selectively lifting at least a portion of the plurality of brushes from at least a portion of the plurality of slip rings is performed when the WRIM achieves a predetermined speed.

18. A brush lifting system for an induction motor, comprising:
  an actuating mechanism in operable communication with a plurality of brushes and a plurality of electrical contacts, wherein each of the plurality of brushes is to selectively contact a respective slip ring of an induction motor, and wherein the plurality of electrical contacts is in electrical communication with respective terminals of rotor windings of the induction motor;
  wherein, when the actuating mechanism is actuated, at least a portion of the plurality of electrical contacts creates electrical shorts between at least a portion of the plurality of slip rings and the rotor windings of the induction motor;
  wherein, when the actuating mechanism is actuated, at least a portion of the plurality of brushes is lifted from contacting the plurality of slip rings;
  a respective one of a plurality of brush holders associated with each of the plurality of brushes; wherein:
  the plurality of brushes is configured into groups of brushes;
  each of the brush holders of the groups of brushes is operably connected to a same one of a plurality of shafts;
  each brush of each group of brushes is aligned with a respective one of the plurality of slip rings for selective contact therewith; and
  the actuating mechanism is to selectively apply rotational movement to each of the brush holders about the plurality of shafts to selectively engage and disengage the respective group from the plurality of slip rings.

* * * * *